United States Patent
Carey et al.

(10) Patent No.: US 9,794,190 B2
(45) Date of Patent: Oct. 17, 2017

(54) MANAGING ASSET DEPLOYMENT FOR A SHARED POOL OF CONFIGURABLE COMPUTING RESOURCES

(71) Applicant: International Business Machines Corporation, Armonk, NY (US)

(72) Inventors: James E. Carey, Rochester, MN (US); Bryan M. Jones, Rochester, MN (US); Aditi Rajagopal, Rochester, MN (US); Ryan L. Rossiter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/623,327

(22) Filed: Feb. 16, 2015

(65) Prior Publication Data

US 2016/0241490 A1 Aug. 18, 2016

(51) Int. Cl.
*H04L 12/46* (2006.01)
*H04L 12/24* (2006.01)
*H04L 12/911* (2013.01)
*G06F 9/455* (2006.01)
*G06F 9/50* (2006.01)

(52) U.S. Cl.
CPC ........ *H04L 47/783* (2013.01); *G06F 9/45558* (2013.01); *G06F 9/5077* (2013.01); *H04L 12/4641* (2013.01); *H04L 41/12* (2013.01); *H04L 47/829* (2013.01); *G06F 2009/4557* (2013.01); *G06F 2009/45595* (2013.01)

(58) Field of Classification Search
CPC .... H04L 47/829; H04L 41/12; H04L 12/4641
USPC ..... 709/224, 226, 229, 219; 718/1, 104, 105
See application file for complete search history.

(56) References Cited

U.S. PATENT DOCUMENTS

| 7,430,610 | B2 | 9/2008 | Pace et al. | |
|---|---|---|---|---|
| 8,468,230 | B2 * | 6/2013 | Murata | G06F 9/4856 709/223 |
| 8,583,769 | B1 * | 11/2013 | Peters | G06F 9/541 709/221 |
| 8,706,869 | B2 * | 4/2014 | Campion | G06F 9/5066 709/219 |
| 8,762,986 | B2 | 6/2014 | Gebhart et al. | |

(Continued)

OTHER PUBLICATIONS

"A System for Dynamic Server Allocation in Application Server Clusters"—Chester et al, University of Warwick, Coventry, Mar. 2011 https://pdfs.semanticscholar.org/a9d6/8b0e993da194568b0bc28ad59bf920e91a61.pdf.*

(Continued)

*Primary Examiner* — Randy Scott
(74) *Attorney, Agent, or Firm* — James L. Olsen

(57) ABSTRACT

Disclosed aspects include managing asset deployment for a shared pool of configurable computing resources having a set of virtual machines associated with a deployment server. A set of deployment topology data is collected for the shared pool of configurable computing resources. Using the set of deployment topology data, it is determined to establish a dynamic management server communicatively connected with both the deployment server and the set of virtual machines. Based on the set of deployment topology data, the dynamic management server is established communicatively connected with both the deployment server and the set of virtual machines.

19 Claims, 5 Drawing Sheets

(56) References Cited

U.S. PATENT DOCUMENTS

| | | | |
|---|---|---|---|
| 8,990,550 B1* | 3/2015 | Hushon | H04L 63/0876 713/2 |
| 2004/0015581 A1 | 1/2004 | Forbes | |
| 2008/0282325 A1* | 11/2008 | Oyama | H04L 61/2015 726/4 |
| 2013/0179289 A1* | 7/2013 | Calder | G06Q 30/08 705/26.3 |
| 2014/0007189 A1* | 1/2014 | Huynh | G06F 3/0622 726/3 |
| 2014/0317617 A1* | 10/2014 | O'Donnell | G06F 9/45533 718/1 |
| 2015/0347264 A1* | 12/2015 | Mohammed | G06F 11/3006 714/45 |

OTHER PUBLICATIONS

"Performance Tuning with SQL Server Dynamic Management Views"—Davidson et al, Red-Gate, Jul. 2010 https://assets.red-gate.com/community/books/performance-tuning-with-dmvs.pdf.*
Mell, Peter et al., "The NIST Definition of Cloud Computing," National Institute of Standards and Technology, Oct. 7, 2009, Version 15, NIST, Gaithersburg, MD, US.
Carey et al., "Managing Asset Deployment for a Shared Pool of Configurable Computing Resources", U.S. Appl. No. 14/718,068, filed May 20, 2015.
List of IBM Patents or Patent Applications Treated as Related.

* cited by examiner

MANAGING ASSET DEPLOYMENT FOR A SHARED POOL OF CONFIGURABLE COMPUTING RESOURCES

BACKGROUND

This disclosure relates generally to computer systems and, more particularly, relates to managing asset deployment for a shared pool of configurable computing resources. The amount of data that needs to be managed by enterprises is increasing. Management of asset deployment may be desired to be performed with as few restrictions as possible. As data needing to be managed increases, the need for management efficiency may increase.

SUMMARY

Disclosed aspects include managing asset deployment for a shared pool of configurable computing resources having a set of virtual machines associated with a deployment server. A set of deployment topology data is collected for the shared pool of configurable computing resources. Using the set of deployment topology data, it is determined to establish a dynamic management server communicatively connected with both the deployment server and the set of virtual machines. Based on the set of deployment topology data, the dynamic management server is established communicatively connected with both the deployment server and the set of virtual machines.

In embodiments, the set of deployment topology data is monitored in response to collecting the set of deployment topology data. In response to monitoring the set of deployment topology data, a triggering event may be detected. In response to detecting the triggering event, it may be determined to establish the dynamic management server. In embodiments, an installation request may be initiated by the deployment server. In response to the installation request, it may be determined (e.g., by the deployment server) to establish a dynamic management server. In response to establishing the dynamic management server, the installation request can be processed. In embodiments, the set of deployment topology data (e.g., a set of historical installation data, a record of dynamic management servers) may be analyzed. Based on corresponding data analytics, it can be determined to establish the dynamic management server.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
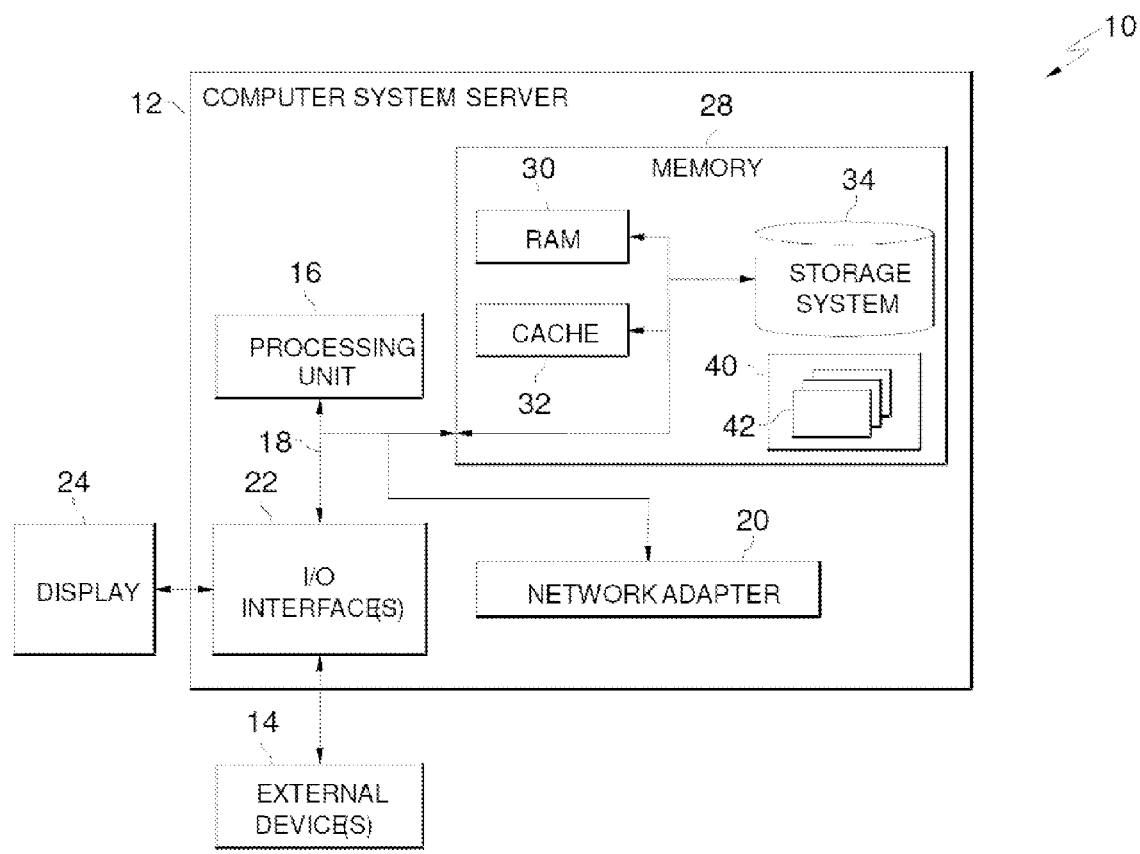
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure dynamically provide asset deployment management for a shared pool of configurable computing resources. Disclosed aspects may have performance or efficiency benefits by using dynamic allocation for a distributed installation of an asset (e.g., content, configurations, applications, files). Altogether, a shared pool of configurable computing resources may be managed more efficiently using a dynamic management server.

Disclosed aspects include analyzing a set of deployment topology data (e.g., an installation topology) to determine whether a dynamic management server (e.g., a local coordination server) would benefit at the time of asset deployment (e.g., the installation). The analysis may be carried out based on historic information gathered from previous installations, existing local coordination servers, or high demand for multiple local coordination servers at the location. Features disclosed include creating and utilizing the local coordination server where the local coordination server is a virtual machine that can be used as a secure shell gateway.

To illustrate, consider a distributed installation of an asset. Installation in, for example, a hybrid computing environment can have challenges such as quickly creating and installing the virtual machines desired for a distributed application in the hybrid computing environment. At times, the installation server can have a bottleneck (e.g., a large volume of data attempting to pass through a small access-point at a particular time). A content delivery network (CDN) uses static servers as a local cache for end users. When an asset is transmitted, the CDN finds the server that is geographically closest to the end user, and sends the content from that server. However, if a large number of assets are transmitted to an area in which there is no CDN server, a manual process is used to add another server to the CDN (the static nature of a CDN has a dedicated server which may be described as fixed, constant, unchangeable, inflexible, or settled). In contrast, the dynamic nature of aspects of the present disclosure may be described as changeable, adaptable, volatile, variable, unfixed, fluctuant, alterable, inconstant, or without a dedicated server to deploy virtual appliances.

Aspects of the disclosure include a method, system, and computer program product of managing asset deployment for a shared pool of configurable computing resources. The shared pool of configurable computing resources has a set of virtual machines associated with (e.g., connected to) a deployment server. A set of deployment topology data for the shared pool of configurable computing resources is collected or monitored. Using the set of deployment topology data, a determination is made to establish a dynamic management server. Based on the set of deployment topology data, the dynamic management server is established.

The dynamic management server is communicatively connected with both the deployment server and the set of virtual machines.

In embodiments, the set of deployment topology data is monitored in response to collecting the set of deployment topology data. In response to monitoring the set of deployment topology data, a triggering event may be detected. In response to detecting the triggering event, it may be determined to establish the dynamic management server. In embodiments, an installation request may be initiated by the deployment server. In response to the installation request, it may be determined (e.g., by the deployment server) to establish a dynamic management server. In response to establishing the dynamic management server, the installation request can be processed. In embodiments, the set of deployment topology data (e.g., a set of historical installation data, a record of dynamic management servers) may be analyzed. Based on corresponding data analytics, it can be determined to establish the dynamic management server.

Aspects of the disclosure include the dynamic management server including/being a virtual machine. In embodiments, the dynamic management server is established at a location nearer to the set of virtual machines than to the deployment server. Performance/efficiency can be positively influenced by structuring the dynamic management server to instantiate an asset from the deployment server to the set of virtual machines. Based on the asset to be instantiated, a set of staging parameters for the dynamic management server may be constructed. According to the set of staging parameters (e.g., installation order/priority), asset deployment can be processed by the dynamic management server. Altogether, aspects of the disclosure provide a methodology for managing asset deployment that may provide performance or efficiency benefits.

It is understood in advance that although this disclosure includes a detailed description regarding cloud computing, implementation of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
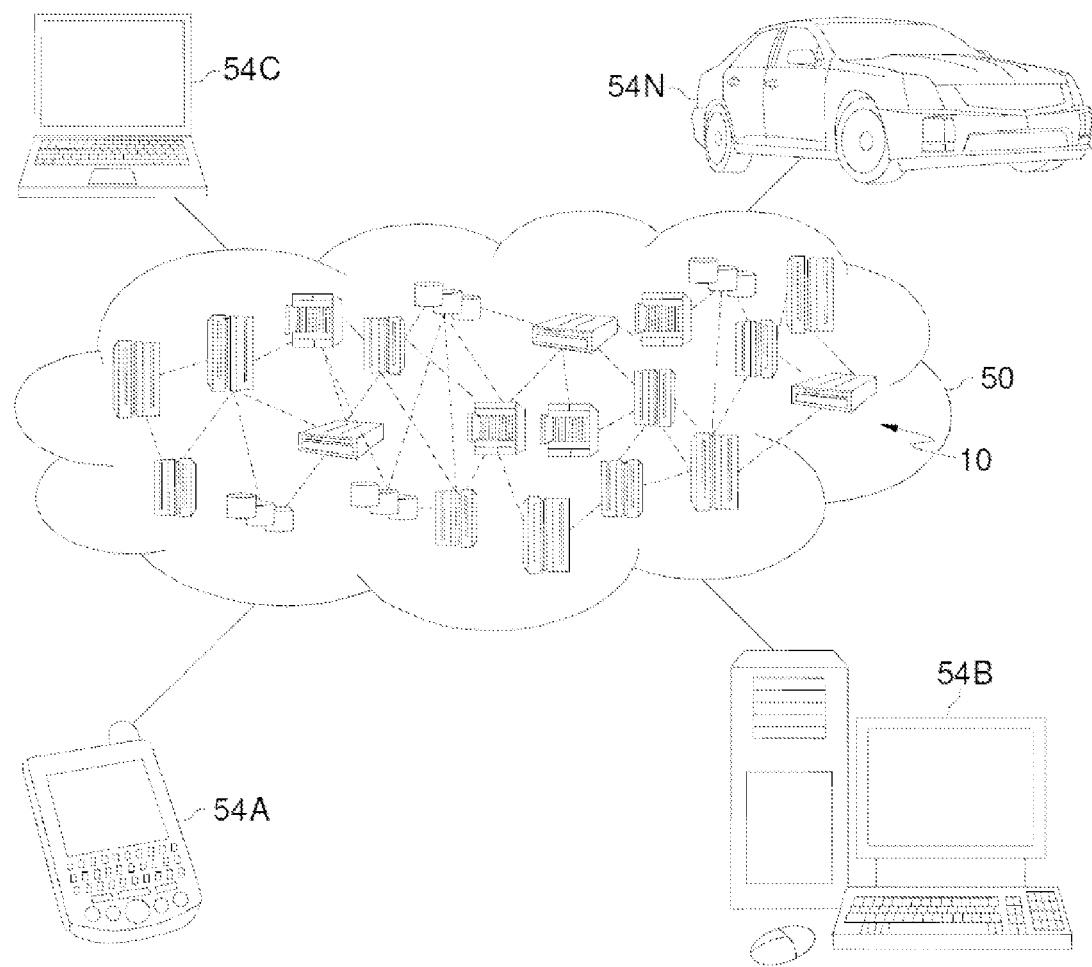
FIG. 2 depicts a cloud computing environment according to embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
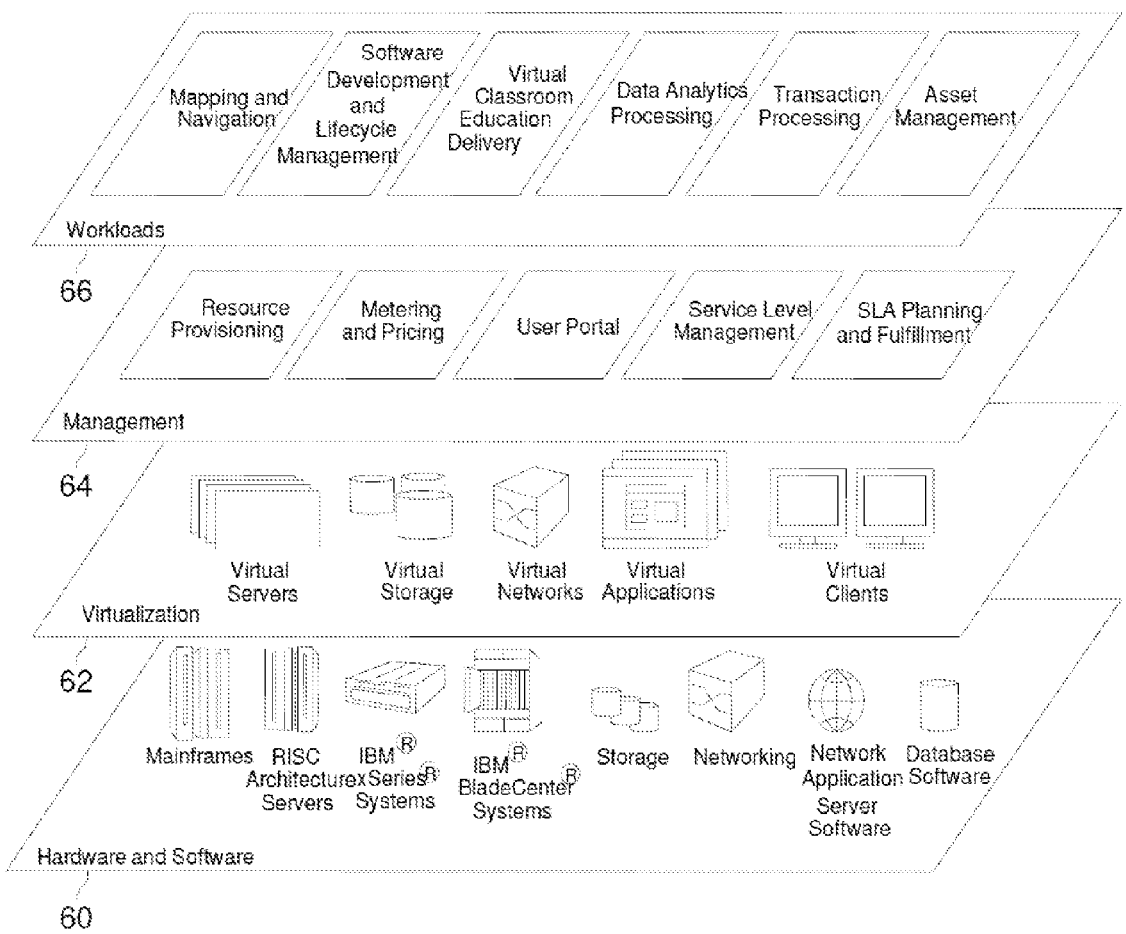
FIG. 3 depicts abstraction model layers according to embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components.

Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and asset management. Asset management may provide local coordination for a distributed installation of an asset. Performance or efficiency benefits may be realized when managing asset deployment (e.g., using dynamic allocation).

Figure 4:
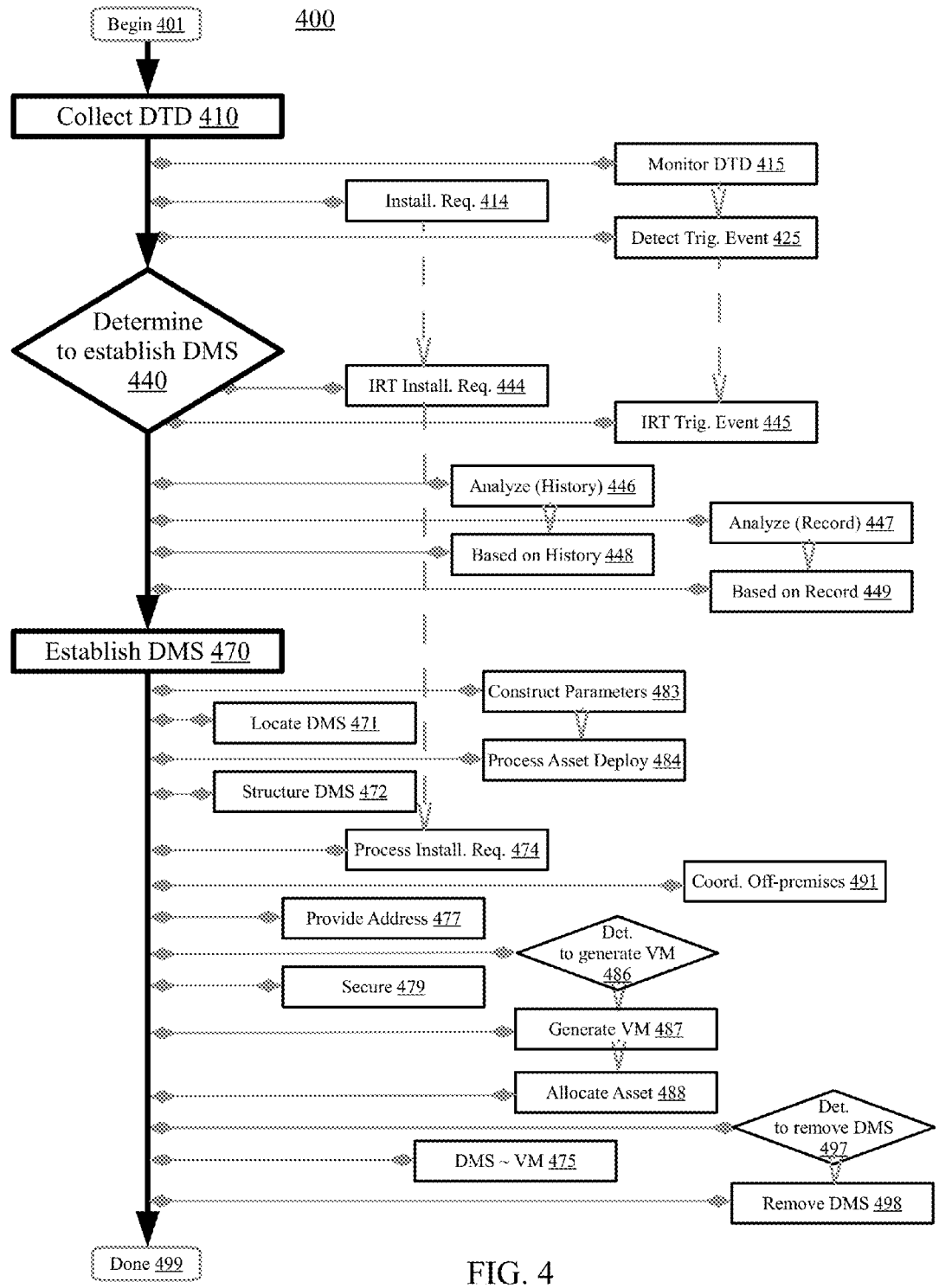
FIG. 4 is a flowchart illustrating a method of managing asset deployment for a shared pool of configurable computing resources according to embodiments.

FIG. 4 is a flowchart illustrating a method 400 of managing asset deployment for a shared pool of configurable computing resources according to embodiments. The shared pool of configurable computing resources has a set of virtual machines associated with (e.g., communicatively linked to) a deployment server. The deployment server can be a network host used to assist in distributing assets (e.g., content, configurations, applications, files) to a client. Aspects of method 400 may dynamically provide a server for local coordination of a distributed installation of an asset/application/file. Method 400 may begin at block 401.

At block 410, a set of deployment topology data (DTD) for the shared pool of configurable computing resources is collected. The set of deployment topology data may include information relating to utilities or computing resources of a public, private, or hybrid environment. The set of deployment topology data may have, for example, metadata relating to virtual machines and interactions of hosts, clients, etc. Geographical location for network devices may be included in the set of deployment topology data. The set of deployment topology data may track content being transmitted from particular locations and a count of transmissions may be collected/monitored. Records of error events, gateways, bandwidth, latency, temporal calculations, supply, demand, history, forecasts, paths, or associated hosts/clients may be included in the set of deployment topology data. The global shape of the set of deployment topology data may provide information about the shared pool of configurable computing resources. In certain embodiments, the set of deployment topology data may be stored in a multi-dimensional area on the deployment server. Other aspects of the set of deployment topology data are considered and contemplated, such as those related to computational topology for instance.

In various embodiments, collecting can include monitoring at block 415. In certain embodiments, collecting may be monitoring. Monitoring the set of deployment topology data can occur in response to collecting the set of deployment topology data. In response to monitoring the set of deployment topology data, a triggering event may be detected at block 425. For example, the triggering event can include at least a subset of the set of deployment topology data meeting a threshold value (e.g., an installation speed value drops below a benchmark that indicates a bandwidth/latency issue, the ratio of deployment management servers allocating to certain off-premises virtual machines is inadequate relative to a user-defined performance ratio). In embodiments, an installation request may be initiated by the deployment server at block 414. The installation request may be configured to be transmitted by the deployment server to end-users such as virtual machines. The installation request may indicate data packets for transmission to a plurality of end-users in a local geographic region (e.g., transmission of at least some identical data from San Francisco to both a first entity located in the north-side of Chicago and a second entity located in the south-side of Chicago).

At block 440, a determination is made to establish a dynamic management server. The determination is made using the set of deployment topology data. In embodiments, the determination is made at block 445 in response to detecting the triggering event at block 425. In embodiments, the determination is made at block 444 in response to the installation request 414. Accordingly, the dynamic management server may be established and tasked to positively impact the challenge indicated by the set of deployment topology data (e.g., temporal delay in distribution of assets, efficiency challenges in transmitting data packets, bandwidth usage). In embodiments, the deployment server may ascertain that a bottleneck exists in data transfer. The bottleneck may be positively addressed efficiently by creating the dynamic management server without administrator involvement (e.g., a non-manual process). Dynamically addressing the bottleneck can have performance and efficiency benefits relative to a static solution which may require additional hardware.

In embodiments, the set of deployment topology data may be analyzed for use in making the determination whether to establish the deployment management server. For instance, a set of historical installation data (e.g., information gathered from previous installations) may be examined at block 446. Based on the set of historical installation data, it can be determined at block 448 to establish the dynamic management server (e.g., whereby the previous installations indicate users in Minnesota access content related to cold temperatures more frequently than users in Texas). As another example of analysis, a record of dynamic management servers (e.g., information about dynamic management servers in-service) can be inquired of a database at block 447. Based on the record of dynamic management servers, it can be determined at block 449 to establish the dynamic management server (e.g., demand for information related to college football increases near university stadiums on Saturdays when the institution's football team hosts a game).

At block 470, the dynamic management server is established. The dynamic management server is communicatively connected with both the deployment server and the set of virtual machines (e.g., a gateway in between). In certain embodiments, the deployment server creates the dynamic management server. The dynamic management server is established based on the set of deployment topology data. The dynamic management server may be established local to the set of virtual machines to deliver assets efficiently while meeting performance benchmarks (e.g., quickly and reliably). In embodiments, the dynamic management server acts as a gateway and coordinator for distributing assets (e.g., a distributed installation). In various embodiments, the dynamic management server may be considered a local coordination server (i.e., local to the end-users).

In embodiments, the dynamic management server is established at a location nearer to the set of virtual machines than to the deployment server at block 471. For example, if the deployment server is located on-premises at a downtown hospital creating the dynamic management server off-premises next door to the server-farm on the outskirts of town. In embodiments, the dynamic management server may be structured to instantiate an asset from the deployment server to the set of virtual machines at block 472. In such embodiments, an expected performance value subsequent to instantiating the asset can exceed a performance threshold value that is related to the set of deployment topology data. For instance, configuration of the dynamic management server may be developed to efficiently deliver and install an application update to semi-trucks every weeknight at 3 am (e.g., due to data analytics of the set of topology data of application downtime in combination with a cluster of vehicles located at truck-stops). As such, the number of semi-trucks updated in a one-hour period after establishing the dynamic management server at a truck-stop may be double that which have been updated in the entire previous day according to the set of topology data, all the while using only ten percent of the bandwidth in the one hour as in the previous day's updates.

In embodiments, the dynamic management server can include/be/be-created-as a virtual machine at block 475. Using a group of virtual machines is contemplated to, for instance, divide tasks categorically (e.g., provider application installation vs. user content delivery). In embodiments, in response to establishing the dynamic management server, the installation request (see blocks 414 and 44) can be processed at block 474. In various embodiments, based on the asset to be instantiated, a set of staging parameters for the dynamic management server may be constructed at block 483. According to the set of staging parameters (e.g., installation order/priority), asset deployment can be processed by the dynamic management server at block 484. As such, assets expected to be used first can be sent first (e.g., installer framework before capstone content).

Aspects of the disclosure include the set of virtual machines having both a first virtual machine and a second virtual machine. Based on an asset performance parameter (e.g., temporal delay exceeds a threshold value which is user-defined), it may be determined to generate a third virtual machine for an asset to be distributed at block 486. The dynamic management server can subsequently generate the third virtual machine at block 487 to assist with processing. Thereafter, allocation of at least a first portion of the asset to the first virtual machine, at least a second portion of the asset to the second virtual machine, and at least a third portion of the asset to the third virtual machine occurs at block 488. Aspects include the shared pool of configurable computing resources being a hybrid computing environment. The set of virtual machines can have both a set of on-premises virtual machines and a set of off-premises virtual machines. In embodiments, the dynamic management server is established off-premises and coordinates asset deployment to at least a subset of the set of off-premises virtual machines at block 491. In such embodiments, the dynamic management server does not coordinate asset deployment to the set of on-premises virtual machines.

In embodiments, a computer network address (e.g., internet protocol address, uniform resource identifier) for the dynamic management server may be provided at block 477. The computer network address may be without a static dedicated server (e.g., configured to be efficiently changed by the deployment server). In embodiments, the dynamic management server can have a set of keys of a set of systems being installed to secure data communication via a secure channel at block 479 (e.g., secure shell gateway having all authentication and access to process installation).

Aspects of the disclosure include using the set of deployment topology data to determine to remove the dynamic management server communicatively connected with both the deployment server and the set of virtual machines at block 497. For example, determining that a created dynamic management server is no longer providing performance/efficiency benefits (e.g., in the examples above the truckstop temporarily/permanently closes, the day of the college football comes to a close, or one of the areas of Chicago no longer requires the same content being transmitted as the other area). Based on the set of deployment topology data, the dynamic management server communicatively connected with both the deployment server and the set of virtual machines is removed (e.g., deleted, abolished, eliminated, closed) at block 498. Removal may occur in a similar manner to establishment, with related considerations as described.

Method 400 concludes at block 499. Aspects of method 400 may provide performance or efficiency benefits when managing asset deployment. For example, aspects of method 400 include dynamically providing local coordination for a distributed installation of an asset. Altogether, a shared pool of configurable computing resources may be managed more efficiently.

Figure 5:
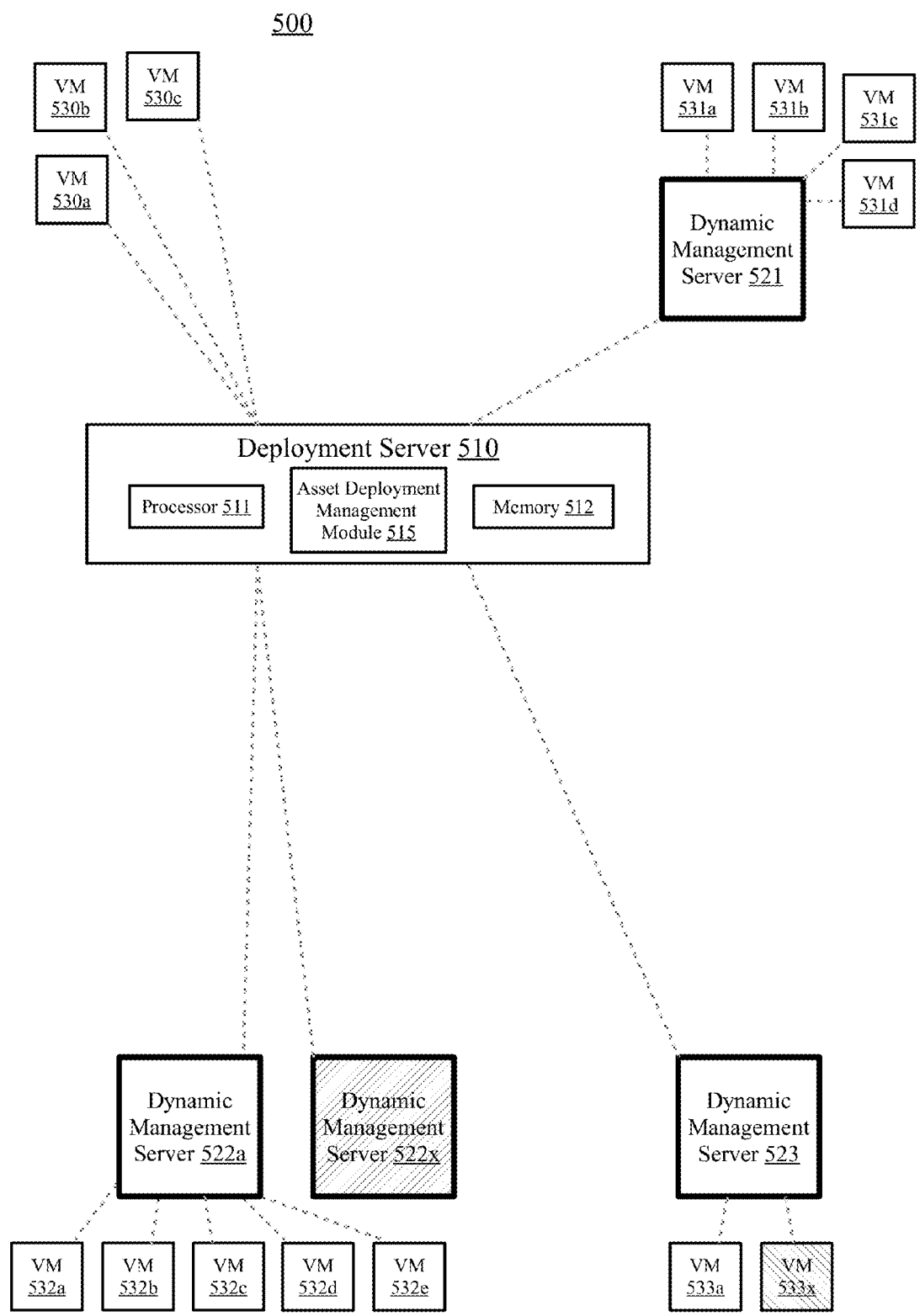
FIG. 5 shows a system for managing asset deployment for a shared pool of configurable computing resources according to embodiments.

FIG. 5 shows a system 500 for managing asset deployment for a shared pool of configurable computing resources according to embodiments. In embodiments, method 400 may be implemented using a module such as an asset deployment management module 515. As such, aspects of the discussion related to FIG. 4 and method 400 may be used/applied/implemented in the system 500. Asset deployment management module 515 may be implemented in hardware, software or firmware executable on hardware, or a combination thereof. For example, module functionality that may occur in a deployment server 510 may actually be implemented in dynamic management servers 521-523 or virtual machines 530-533. Other functionality may be distributed across the deployment server 510, dynamic management servers 520-524, or virtual machines 530-533.

In embodiments, the deployment server 510 may have (or be linked to) the asset deployment module 515, a processor 511, and memory 512. The asset deployment management module 515 may be configured and arranged to manage asset deployment for a shared pool of configurable computing resources. The asset deployment management module 515 may include modules/submodules corresponding to aspects of method 400 (e.g., a collecting module to collect a set of deployment topology data, a determining module to determine to establish a dynamic management server, an establishing module to establish the dynamic management server).

The system 500 can include a set of virtual machines. The set of virtual machines may refer to one or more virtual machines. In an embodiment, virtual machines 530a, 530b, 530c, 531a, 531b, 531c, 531d, 532a, 532b, 532c, 532d, 532e, 533a, and 533x may be the set of virtual machines. In embodiments, a first set of virtual machines may include virtual machines 530a, 530b, and 530c; a second set of virtual machines may include virtual machines 531a, 531b, 531c, and 531d; a third set of virtual machines may include virtual machines 532a, 532b, 532c, 532d, and 532e; and, a fourth set of virtual machines may include virtual machines 533a and 533x. In embodiments, some of the virtual machines may be on-premises and others off-premises. For example, the first and second sets of virtual machines may be on-premises while the third and fourth sets of virtual machines may be off-premises. A number of permutations and combinations are considered, such as all of the virtual machines being either on-premises or off-premises (or the first set being private cloud with the second, third, and fourth sets being public cloud), for example.

Dynamic management servers 521, 522a, 522x, and 523 may be dynamically established (or removed). FIG. 5 shows dashed lines communicatively connecting the components depicted. In embodiments, the dashed lines indicate a secure shell gateway. In embodiments, the dashed lines indicate transmissions pushed/published/transmitted from the deployment server to the virtual machines or dynamic management servers. In embodiments, the communicative connections may indicate two-way or one-way connections. Calculating distances represented by the dashed lines may indicate performance/efficiency benefits of the method 400 or system 500.

The dynamic management servers may be considered as intermediaries or gateways between the deployment server and at least a number of the virtual machines. The dynamic management servers may be established based on criteria including quantity of virtual machines served and distance from a particular group of virtual machines to the deployment server. For example, virtual machines 530a, 530b, and 530c may be near to the deployment server 510 and below a threshold number of virtual machines for having a dynamic management server. Also, virtual machines 531a, 531b, 531c, and 531d may have exceeded a quantitative value (e.g., for number of virtual machines, bandwidth stream, temporal delays) so that a dynamic management server 521 has been established.

Dynamic management servers 522a and 522x may correspond to the third set of virtual machines. In embodiments, dynamic management server 522x may be undergoing a dynamic transition (e.g., being dynamically established, being dynamically removed). The dynamic transition may occur, for example, because of a quantity of virtual machines threshold value (e.g., more than 4 virtual machines at a given distance initiates establishment of another dynamic management server or fewer than 6 virtual machines at the given distance initiates downsizing of a number of dynamic management servers to one). In embodiments, dynamic management servers may generate/eliminate virtual machines. Virtual machine 533x illustrates an embodiment where dynamic management server 523 indicates either generation or elimination of virtual machine 533x (e.g., based on a transmission received from the deployment server, publication subscribed-to by the dynamic management server, or some combination thereof such as a user request).

Aspects of system 500 may provide performance or efficiency benefits when managing asset deployment (e.g., using dynamic allocation). For example, aspects of system 500 include dynamically providing local coordination for a distributed installation of an asset. Altogether, a shared pool of configurable computing resources may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of managing asset deployment for a shared pool of configurable computing resources having a set of virtual machines associated with a deployment server, the method comprising:
    collecting a set of deployment topology data for the shared pool of configurable computing resources, wherein the shared pool of configurable computing resources includes a hybrid computing environment and the set of virtual machines includes both a set of on-premises virtual machines and a set of off-premises virtual machines;
    analyzing the set of deployment topology data, wherein the set of deployment topology data includes a set of historical installation data;
    determining, based on the set of historical installation data, to establish the dynamic management server;
    establishing, based on the set of historical installation data, the dynamic management server, wherein the dynamic management server is established off-premises and coordinates asset deployment to at least a subset of the set of off-premises virtual machines; and
    coordinating, by the dynamic management server, asset deployment to at least the subset of the set of off-premises virtual machines.

2. The method of claim 1, further comprising establishing the dynamic management server at a location nearer to the set of virtual machines than to the deployment server.

3. The method of claim 1, wherein collecting the set of deployment topology data includes monitoring the set of deployment topology data, and further comprising:
    detecting, in response to monitoring the set of deployment topology data, a triggering event that includes at least a subset of the set of deployment topology data meeting a threshold value; and
    determining to establish the dynamic management server in response to detecting the triggering event.

4. The method of claim 1, wherein establishing, based on the set of deployment topology data, the dynamic management server includes:
    structuring the dynamic management server to instantiate an asset from the deployment server to the set of virtual machines, wherein an expected performance value subsequent to instantiating the asset exceeds a performance threshold value that is related to the set of deployment topology data.

5. The method of claim 1, further comprising:
    initiating, by the deployment server, an installation request;
    determining, in response to the installation request, to establish a dynamic management server; and
    processing, in response to establishing the dynamic management server, the installation request.

6. The method of claim 1, wherein the set of virtual machines includes both a first virtual machine and a second virtual machine, and further comprising:
    determining, based on an asset performance parameter, to generate a third virtual machine for an asset to be distributed;
    generating, in response to establishing the dynamic management server, the third virtual machine; and
    allocating at least a first portion of the asset to the first virtual machine, at least a second portion of the asset to the second virtual machine, and at least a third portion of the asset to the third virtual machine.

7. The method of claim 1, wherein:
    the dynamic management server does not coordinate asset deployment to the set of on-premises virtual machines.

8. The method of claim 1, wherein establishing the dynamic management server includes creating, as the dynamic management server, a virtual machine.

9. The method of claim 1, further comprising providing, without a static dedicated server, a computer network address for the dynamic management server.

10. The method of claim 1, wherein the dynamic management server has a set of keys of a set of systems being installed to secure data communication via a secure channel.

11. The method of claim 1, further comprising:
    constructing, based on an asset to be instantiated, a set of staging parameters for the dynamic management server; and
    processing, by the dynamic management server, asset deployment according to the set of staging parameters.

12. The method of claim 11, wherein the set of staging parameters includes an installation order.

13. The method of claim 1, further comprising:
    metering use of the dynamic management server; and
    generating an invoice based on the metered use.

14. The method of claim 1, wherein the dynamic management server is communicatively connected with both the deployment server and the set of virtual machines.

15. The method of claim 1, wherein the set of on-premises virtual machines is hosted by a first set of servers at a first physical location, and wherein the set of off-premises virtual machines is hosted by a second set of servers at a second physical location which differs from the first physical location.

16. The method of claim 1, further comprising:
    deploying, using the dynamic management server, one or more assets to at least the subset of the set of off-premises virtual machines.

17. The method of claim 1, wherein the set of virtual machines includes both a first virtual machine and a second virtual machine, and further comprising:
- determining, based on an asset performance parameter, to generate a third virtual machine for an asset to be distributed;
- establishing the dynamic management server at a location nearer to the set of virtual machines than to the deployment server;
- constructing, based on an asset to be instantiated, a set of staging parameters for the dynamic management server, wherein the set of staging parameters includes an installation order;
- generating, in response to establishing the dynamic management server, the third virtual machine;
- processing, by the dynamic management server, asset deployment using to the installation order; and
- allocating at least a first portion of the asset to the first virtual machine, at least a second portion of the asset to the second virtual machine, and at least a third portion of the asset to the third virtual machine.

18. A computer-implemented method of managing asset deployment for a shared pool of configurable computing resources having a set of virtual machines associated with a deployment server, the method comprising:
- collecting a set of deployment topology data for the shared pool of configurable computing resources, wherein the shared pool of configurable computing resources includes a hybrid computing environment and the set of virtual machines includes both a set of on-premises virtual machines and a set of off-premises virtual machines;
- determining, using the set of deployment topology data, to establish a dynamic management server;
- establishing, based on the set of deployment topology data, the dynamic management server wherein the dynamic management server is established off-premises and coordinates asset deployment to at least a subset of off-premises virtual machines;
- coordinating, by the dynamic management server, asset deployment to at least the subset of the set of off-premises virtual machines.
- determining, using the set of deployment topology data, to remove the dynamic management server communicatively connected with both the deployment server and the set of virtual machines; and
- removing, based on the set of deployment topology data, the dynamic management server communicatively connected with both the deployment server and the set of virtual machines.

19. A computer-implemented method of managing asset deployment for a shared pool of configurable computing resources having a set of virtual machines associated with a deployment server, the method comprising:
- collecting a set of deployment topology data for the shared pool of configurable computing resources, wherein the shared pool of configurable computing resources includes a hybrid computing environment and the set of virtual machines includes both a set of on-premises virtual machines and a set of off-premises virtual machines;
- analyzing the set of deployment topology data, wherein the set of deployment topology data includes a record of dynamic management servers;
- determining, based on the record of dynamic management servers, to establish the dynamic management server;
- establishing, based on the record of dynamic management servers, the dynamic management server, wherein the dynamic management server is established off-premises and coordinates asset deployment to at least a subset of off-premises virtual machines; and
- coordinating, by the dynamic management server, asset deployment to at least the subset of the set of off-premises virtual machines.

* * * * *